United States Patent
Bhargava

(10) Patent No.: US 11,611,483 B2
(45) Date of Patent: Mar. 21, 2023

(54) LEARNING-BASED DYNAMIC DETERMINATION OF SYNCHRONOUS/ASYNCHRONOUS BEHAVIOR OF COMPUTING SERVICES

(71) Applicant: SAP SE, Walldorf (DE)

(72) Inventor: Apoorv Bhargava, Bangalore (IN)

(73) Assignee: SAP SE, Walldorf (DE)

( * ) Notice: Subject to any disclaimer, the term of this patent is extended or adjusted under 35 U.S.C. 154(b) by 28 days.

(21) Appl. No.: 17/370,907

(22) Filed: Jul. 8, 2021

(65) Prior Publication Data
US 2023/0012305 A1    Jan. 12, 2023

(51) Int. Cl.
| | |
|---|---|
| *H04L 41/0896* | (2022.01) |
| *H04L 41/5006* | (2022.01) |
| *G06N 20/00* | (2019.01) |
| *G06F 9/50* | (2006.01) |
| *H04L 41/5019* | (2022.01) |

(52) U.S. Cl.
CPC ........ *H04L 41/0896* (2013.01); *G06F 9/5055* (2013.01); *G06F 9/5072* (2013.01); *G06N 20/00* (2019.01); *H04L 41/5006* (2013.01); *H04L 41/5019* (2013.01)

(58) Field of Classification Search
CPC ............. H04L 41/0896; H04L 41/5006; H04L 41/5019; G06F 9/5055; G06F 9/5072; G06N 20/00
See application file for complete search history.

(56) References Cited

U.S. PATENT DOCUMENTS

| | | | |
|---|---|---|---|
| 2020/0234119 A1* | 7/2020 | Shi | .......................... G06N 3/063 |
| 2021/0080982 A1* | 3/2021 | Mehta | .................. G06F 11/3006 |

FOREIGN PATENT DOCUMENTS

| | | | | | |
|---|---|---|---|---|---|
| GB | 2450862 A | * | 1/2009 | ............. | H03K 5/135 |

OTHER PUBLICATIONS

Oasis, "OData Version 4.0 Part 1: Protocol," <http://docs.oasis-open.org/odata/odata/v4.0/os/part1-protocol/odata-v4.0-os-part1-protocol.htm>, 67 pages (Feb. 24, 2014).

* cited by examiner

*Primary Examiner* — Michael A Keller
(74) *Attorney, Agent, or Firm* — Klarquist Sparkman, LLP

(57) ABSTRACT

Technologies are described for determining between synchronous and asynchronous modes for computing service requests. Computing service requests are received by a computing service from clients. The computing service dynamically determines whether to use synchronous mode or asynchronous mode for processing the computing service requests. The computing service makes the dynamic determination of which mode to use (synchronous or asynchronous) based on various criteria, which can include synchronous/asynchronous mode recommendations generated by machine learning models and/or synchronous/asynchronous mode recommendations generated by static rules.

19 Claims, 6 Drawing Sheets

LEARNING-BASED DYNAMIC DETERMINATION OF SYNCHRONOUS/ASYNCHRONOUS BEHAVIOR OF COMPUTING SERVICES

BACKGROUND

Modern computing services, such as cloud-based services, need to process service requests from many clients (e.g., in a multi-tenant environment). Typical computing services process such service requests in either synchronous processing or asynchronous processing. With synchronous processing, the client waits for the result of the request before it proceeds to perform additional processing. With asynchronous processing, the client can perform additional processing and receive the result of the request later.

In typical solutions, the client determines whether to use synchronous processing or asynchronous processing. For example, the client specifies the type of processing to use as part of the request. While client-side selection of the processing mode can be efficient in some situations, it may also cause issues. For example, client-side selection does not take into account the dynamic nature of the computing service (e.g., if the computing service is under heavy load, the computing service may not be able to efficiently process synchronous requests thus causing significant delay while clients are blocked awaiting results). Therefore, client-side selection of the processing mode can lead to inefficient request processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for determining between synchronous and asynchronous modes for computing service requests. Computing service requests are received by a computing service from clients. The computing service dynamically determines whether to use synchronous mode or asynchronous mode for processing the computing service requests (e.g., for each computing service request). The computing service makes the dynamic determination of which mode to use (synchronous or asynchronous) based on various criteria. In some implementations, the computing service uses a synchronous/asynchronous mode recommendation generated by a machine learning model. In some implementations, the computing service also uses a synchronous/asynchronous mode recommendation generated by a set of static rules. In some implementations, a set of static rules is first evaluated to determine whether one of the static rules is satisfied. If one of the static rules is satisfied, then the static rule identifies the mode to use for processing the computing service request. Otherwise, a synchronous/asynchronous mode recommendation generated by a machine learning model is used for processing the computing service request.

DETAILED DESCRIPTION

Overview

Figure 1:
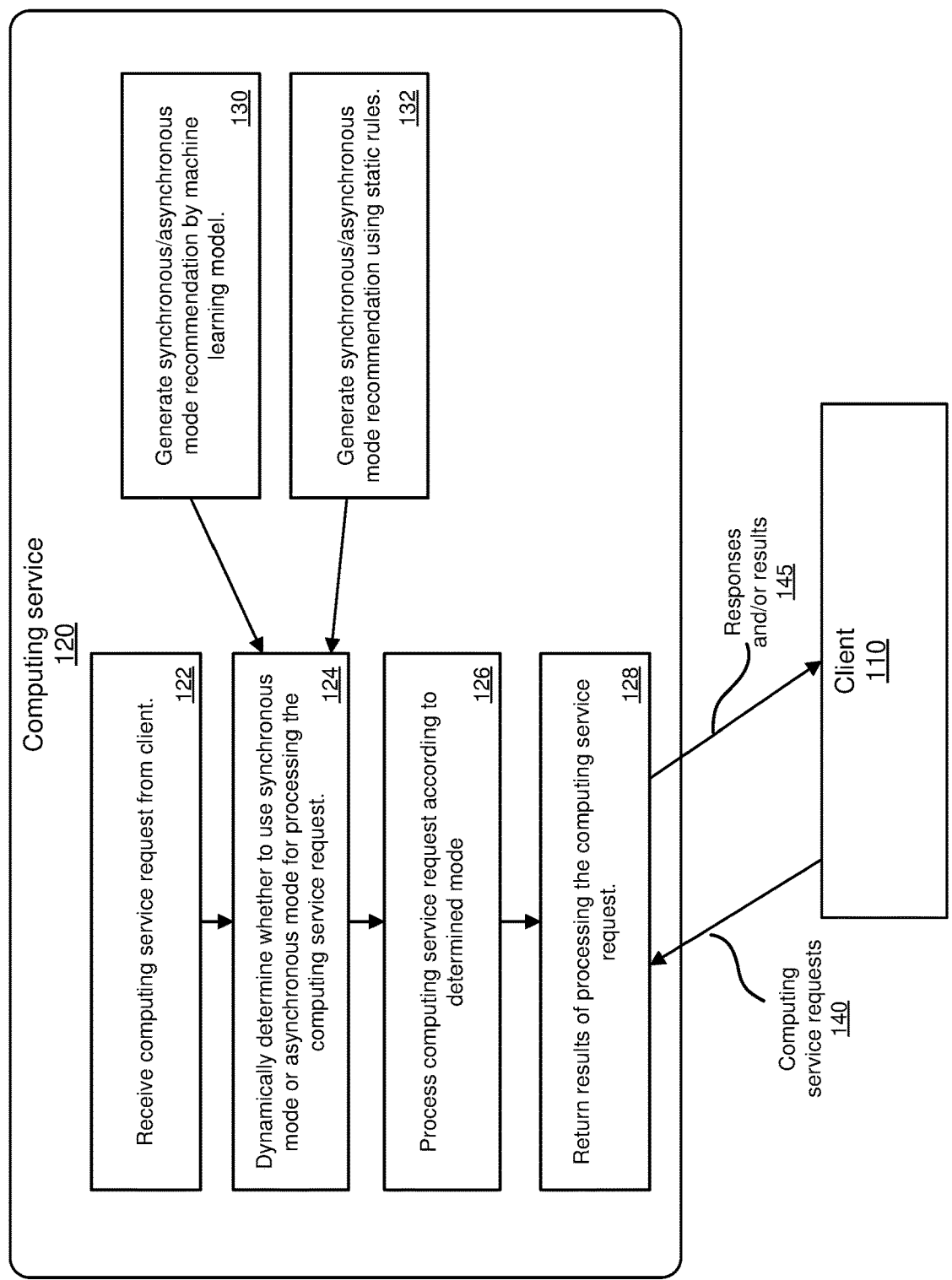
FIG. 1 is an example environment that supports dynamically determining between synchronous and asynchronous modes for processing requests by a computing service.

The following description is directed to technologies for determining between synchronous and asynchronous modes for computing service requests. Computing service requests are received by a computing service from clients. The computing service dynamically determines whether to use synchronous mode or asynchronous mode for processing the computing service requests (e.g., for each computing service request). The computing service makes the dynamic determination of which mode to use (synchronous or asynchronous) based on various criteria. For example, the computing service receives synchronous/asynchronous mode recommendations and makes the dynamic decision based on the recommendations. The synchronous/asynchronous mode recommendations can be generated by machine learning models and/or static rules. In some implementations, client-side preferences are also considered in making the determination of which mode to use.

When a computing service request is processed by a computing service using synchronous mode, the client waits for the result from processing the computing service request. For example, the client waits for the result before the client performs any additional operations associated with the computing service request. Therefore, processing computing service requests in synchronous mode is blocking in nature. There are a number of advantages to processing computing service requests in synchronous mode. For example, using synchronous mode ensures that the result from a given step (e.g., a business logic step) is received before going to the next step (e.g., when the result is needed for the next step). In addition, synchronous mode is less complicated to implement and manage (e.g., in terms of development and operational resources). However, there are a number of limitations to using synchronous mode. Primarily, because synchronous mode is blocking, a client has to wait for a result before proceeding. Therefore, synchronous mode may not be suitable for high load systems or systems that need to scale to handle a large volume of requests and/or many clients (e.g., in a multi-tenant environment).

When a computing service request is processed by a computing service using asynchronous mode, the client does not wait for the result from processing the computing service request (e.g., the client can disconnect from the computing service and perform additional operations associated with the computing service request). In some implementations, the client can receive a response from the computing service (e.g., a unique identifier for the request, such as a unique job identifier). The client can receive the result later (e.g., by polling the computing service or by receiving a call-back from the computing service with the result). Therefore, processing computing service requests in asynchronous mode is non-blocking in nature. There are a number of advantages to processing computing service requests in asynchronous mode. For example, using asynchronous mode the client can continue to perform other operations instead of waiting for the result from processing the computing service request. In addition, asynchronous mode can be more suitable for high load systems and/or systems that support many clients. However, there are a number of limitations to using asynchronous mode. For example, developing and operating a computing service that supports asynchronous mode is typically more complex. As a result, additional conditions (e.g., failure situations) need to be considered by the computing service and client. For example, the client needs to be able to handle situations where the computing service fails to provide a result.

In typical solutions, the client controls the mode (i.e., to control the behavior of the computing service, either synchronous or asynchronous). In other words, the client controls whether a computing service request generated by the client is processed by the computing service using synchronous mode or asynchronous mode. The client can control the mode using an explicit designation. For example, the client can set the mode using an HTTP header field (e.g., setting an HTTP header field "sync" to true can specify synchronous mode, while setting the "sync" field to false can specify asynchronous mode). As another example, the client can specify the mode via the data service protocol being used. In some implementations, the client controls the mode by setting the "respond-async preference" OData (Open Data Protocol) preference (e.g., using OData version 4.0 protocol; the OData protocol is provided by OASIS®).

Such typical solutions (in which the client controls the mode) have a number of limitations. Importantly, such typical solutions cannot account for what is happening at the service side. Modern computing services, such as cloud-based services, typically support many simultaneous client requests (e.g., in a multi-tenant environment). Resource utilization (e.g., computing resources such as CPU, memory, and storage, supporting services such as secondary or external services, etc.) associated with the computing service is dynamic and can vary significantly over time. Limiting the synchronous/asynchronous mode decision to a fixed decision made by the client can prevent the computing service from efficiently processing computing service requests. For example, the service-side environment or situation cannot be considered. In addition, in environments where the computing service supports many clients, client-side mode decisions can be even more problematic because they do not consider the overall computing service environment or what mode decisions are being made by other clients.

The technologies described herein provide improvements over such typical solutions where the client makes the decision of whether to use synchronous mode or asynchronous mode. In the technologies described herein, the decision of whether to use synchronous mode or asynchronous mode is made, at least in part, by the computing service. In this way, the environment or situation of the computing service influences the mode decision. For example, if there is a particular computing resource (e.g., a specific service component) that is heavily loaded, then requests utilizing the particular computing resource can be switched from synchronous mode to asynchronous mode, which can provide more efficient processing (e.g., instead of blocking the client for a significant amount of time).

Example Environments for Dynamically Determining Between Synchronous and Asynchronous Modes In the technologies described herein, environments can be provided that support dynamically determining between synchronous and asynchronous modes for processing requests by a computing service. In making the dynamic determinations, the service-side environment is considered, which can include the load at the computing service, expected processing time for the request, and/or other parameters.

FIG. 1 depicts an example environment 100 that supports dynamically determining between synchronous and asynchronous modes for processing requests by a computing service. The example environment 100 includes client 110. The client 110 can be any type of computing hardware and/or software that is configured (e.g., running computer-executable instructions) to perform operations as described herein. The client 110 can run on various types of computing resources (e.g., a server computer, desktop computer, laptop computer, smart phone, virtual computer, or another type of computing device). The example environment 110 also includes computing service 120. The computing service 120 can be any type of service that that processes computing service requests from clients (e.g., from client 110). The computing service 120 can comprise any type of computing hardware and/or software that is configured (e.g., running computer-executable instructions) to perform operations implementing the technologies described herein. For example, the computing service 120 can be a web service or a cloud service that processes requests from clients (e.g., client 110 and/or other clients) that are received via a network (e.g., comprising the Internet).

As depicted at 140, the client 110 sends requests to the computing service 120. As one example, the computing service 120 can provide a service for calculating income tax and the client 110 can send a request to the computing service 120 for calculating income tax based on income tax information (e.g., personal information, income information, expense information, etc.) included in the request. As another example, the computing service 120 can provide a service for performing currency conversion and the client 110 can send a request to the computing service 120 for performing conversion between various currencies (e.g., to convert a specific U.S. dollar value to Euros).

As depicted at 145, the computing service 120 sends responses and/or results to the client 110. For example, if the computing service 120 is processing an income tax request, then then computing service 120 can send results of the income tax calculation (e.g., comprising income tax form values) to the client 110. As another example, if the computing service 120 is processing a currency conversion request, then the computing service 120 can send results of the currency conversion (e.g., the converted currency value) to the client 110. In some implementations, if the computing service request is being processed by the computing service 120 in asynchronous mode, then the computing service 120 sends a response to the client 110 indicating that asynchronous mode is being used. For example, the response can comprise a unique identifier for the request that the client can use to poll the computing service 120 to retrieve the result at a later time. As another example, the response can comprise an indication that the computing service 120 will contact the client 110 when the result is ready (e.g., as a call-back).

When the computing service 120 receives a computing service request (also referred to as just a request) from a client (e.g., from client 110), the computing service 120 dynamically determines whether to use synchronous mode or asynchronous mode for processing the computing service request. The determination is made at the computing service 120 based on various parameters. In some implementations, the computing service 120 performs the operations depicted at 122, 124, 126, and 128 when determining how to process computing service requests. Specifically, at 122, the computing service 120 receives a computing service request from a client (e.g., from client 110 or from another client). Then, as depicted at 124, the computing service 120 dynamically determines whether to use synchronous mode or asynchronous mode for processing the received computing service request. Next, as depicted at 126, the computing service 120 processes the computing service request using the determined mode (either synchronous mode or asynchronous mode). Finally, at 128, the computing service 120 returns results of processing the computing service request to the client (e.g., to client 110 or to another client). When the computing service request is processed using asynchronous mode, there may be additional communications between the computing service 120 and the client, such as a response indicating that asynchronous mode is being used, and the results of processing the computing service request can be provided to the client at a later time (e.g., in response to a poll or as a call-back).

The computing service 120 considers various criteria when making the determination of whether to use synchronous mode or asynchronous mode for processing computing service requests (e.g., as depicted at 124). In some implementations, the computing service 120 makes the determination based, at least in part, on synchronous/asynchronous mode recommendations. For example, as depicted at 130, a synchronous/asynchronous mode recommendation can be generated by a machine learning model and used in making the determination. As depicted at 132, a synchronous/asynchronous mode recommendation can be generated using static rules and used in making the determination. In general, any number of criteria can be utilized when making the determination (e.g., recommendations provided by machine learning models, recommendations provided by static rules, and/or recommendations generated using other parameters).

In some implementations, a machine learning model generates a synchronous/asynchronous mode recommendation (e.g., as depicted at 130). The machine learning model generates the recommendation based on various parameters. For example, the machine learning model can be a trained machine learning model that has been trained to classify computing service requests as either synchronous or asynchronous using the various parameters (e.g., a machine learning model based on a classification algorithm). In some implementations, the machine learning model provides a confidence score with the recommendation (e.g., as a value or as an indication, such as high, medium, or low).

In some implementations, a set of static rules are used to generate a synchronous/asynchronous mode recommendation (e.g., as depicted at 132). The set of static rules generate the recommendation based on various parameters (e.g., the same parameters used by the machine learning model and/or different parameters). In some implementations, the recommendation provided by the set of static rules is a preference (e.g., a value that uses the same scale as the recommendation provided by the machine learning model). In some implementations, the recommendation generated by the set of static rules is treated as an explicit mode selection (e.g., as an override).

A variety of parameters can be used (e.g., by a machine learning model and/or by static rules) when determining whether to use synchronous mode or asynchronous mode. In some implementations, the parameters include a number of input records received with the computing service request. For example, if the computing service request includes a relatively large number of input records (e.g., a batch comprising a large number of currency conversion records), then a machine learning model and/or static rule may recommend using asynchronous mode. However, if the computing service request includes a relatively small number of input records (e.g., just one or a few currency conversion records), then a machine learning model and/or static rule may recommend using asynchronous mode. Another parameter that can be considered is expected performance of the computing service request. Expected performance can be based on past performance of the same (or similar) computing service requests (e.g., in terms of time taken to process, computing resources used, etc.). For example, if a particular type of computing service request (e.g., an income tax calculation request) typically takes a significant amount of time (e.g., a number of seconds or minutes), then the recommendation (e.g., based on a machine learning model and/or static rule) can be to use asynchronous mode. Another parameter that can be considered is the available computing resources at the computing service. For example, if the load at the computing service is high, then asynchronous mode may be recommended. The available computing resources parameter can also be related to supporting services (e.g., secondary or external services, and/or service components), such as database services or currency conversion services. For example, if an underlying database service that is needed to process a computing service request is experiencing high load and/or high response times (e.g., load and/or response times above a threshold value), then asynchronous mode may be recommended.

Another parameter that can be considered is whether the computing service is deployed as a private cloud (in a single tenant environment) or as a public cloud (in a multi-tenant environment). In a private cloud setup (e.g., where dedicated computing resources are available), a client-side preference can be weighted higher when determining the mode. Another parameter that can be considered is the client's (e.g., the customer's) purchased plan. If the client purchases a premium plan, additional weight can be given to a client-side preference. For example, when the client has purchased a premium plan, the client may be assigned more computing resources and/or receive preferential processing (e.g., allowing the client's computing service requests to be processed more efficiently in synchronous mode). Another parameter that can be considered is a service identifier that identifies the computing service. For example, a given computing service can be associated with a preferred processing mode. Another parameter that can be considered is whether the computing service request is from an internal client or an external client. Any given parameter, by itself, may be enough to make a recommendation, but in some situations multiple parameters are considered in combination (e.g., a machine learning model often considers multiple parameters).

In some implementations, the computing service 120 determines which mode to use by considering the synchronous/asynchronous mode recommendations from both the machine learning model (e.g., as depicted at 130) and the set of static rules (e.g., as depicted at 132). For example, one of the recommendations can be selected (e.g., the recommendation with the higher score or confidence value). In some implementations, different weights are applied to each recommendation (e.g., a first weight for the machine learning model recommendation and a second weight for the recommendation generated by the static rules). In some implementations, the weights that are applied to each recommendation are user configurable. For example, the recommendation generated by the static rules can be weighted higher than the recommendation generated by the machine learning model (e.g., a weight of 0.4 could be set for the machine learning model recommendation and a weight of 0.6 could be set for recommendation generated by static rules). The weighted values from each can then be compared and the highest weighted value recommendation can be selected.

In some implementations, the determination (e.g., performed by the computing service 120) of which mode to use is performed by the following algorithm, in which M is the recommendation from the machine learning model with confidence C (in this implementation, a recommendation of synchronous or asynchronous with confidence value from 0 to 1), S is the recommendation from the static rules (in this implementation, a recommendation of synchronous or asynchronous), $W_m$ is the weight applied to M, and $W_s$ is the weighted applied to S. A recommendation of synchronous has a reference value −1 and a recommendation of asynchronous has a reference value of 1.

$$WA = \text{average}(M*C*W_m, S*W_s)$$

If WA<0, then synchronous mode is selected
Else, asynchronous mode is selected

To illustrate how the above algorithm is used, consider an example where the machine learning model provides a recommendation of synchronous mode with 80% confidence (a confidence value of 0.8), the static rules provide a recommendation of asynchronous mode, and where $W_m$ is 0.4 and $W_s$ is 0.6. In this example, WA=average(−1*0.8*0.4,1*0.6)=0.14. Therefore, because WA is 0.14 (which is not <0), asynchronous mode is selected.

In some implementations, a computing service request that matches a static rule can treated as an override (e.g., a static rule can be configured such that its generated mode will be used as an override). In other words, if a static rule is matched, then the mode generated by the static rule will be used for processing the computing service request regardless of any recommendation provided by the machine learning model (e.g., evaluation by the machine learning model can be skipped in this situation). For example, a static rule could consider the number of records being processed by the computing service request. If the number of records is greater than 10, then the static rule can specify asynchronous mode as an override. The computing service 120 would receive the recommendation (in this example, an explicit override) and process the computing service request using asynchronous mode. In some implementations, a static rule can be configured (e.g., a user-configurable setting) to generate its recommendation as an override or as a preference (e.g., as a preference score or other indication).

In the example environment 100, the computing service 120 makes the decision of whether to use synchronous mode or asynchronous mode when processing computing service requests. In some implementations, the decision is made entirely by the computing service 120 (i.e., without considering any preference provided by the client, such as by client 110). However, in some implementations, the computing service 120 makes the decision using a combination of service-side parameters and client-side preference (e.g., a preference provided by client 110 along with the request). For example, the computing service 120 can receive a client-side preference (e.g., a client-side synchronous/asynchronous mode hint) that can be used in combination with other recommendations generated at the service (e.g., by the machine learning model and/or by static rules) in making the mode determination. In some implementations, the client-side preference is weighted along with the machine learning model recommendation and/or the recommendation generated by the static rules. Depending on the specific situation (e.g., depending on the type of requests being submitted by the client), the client-side preference can be weighted higher or lower (e.g., as a user-configurable setting).

Figure 2:
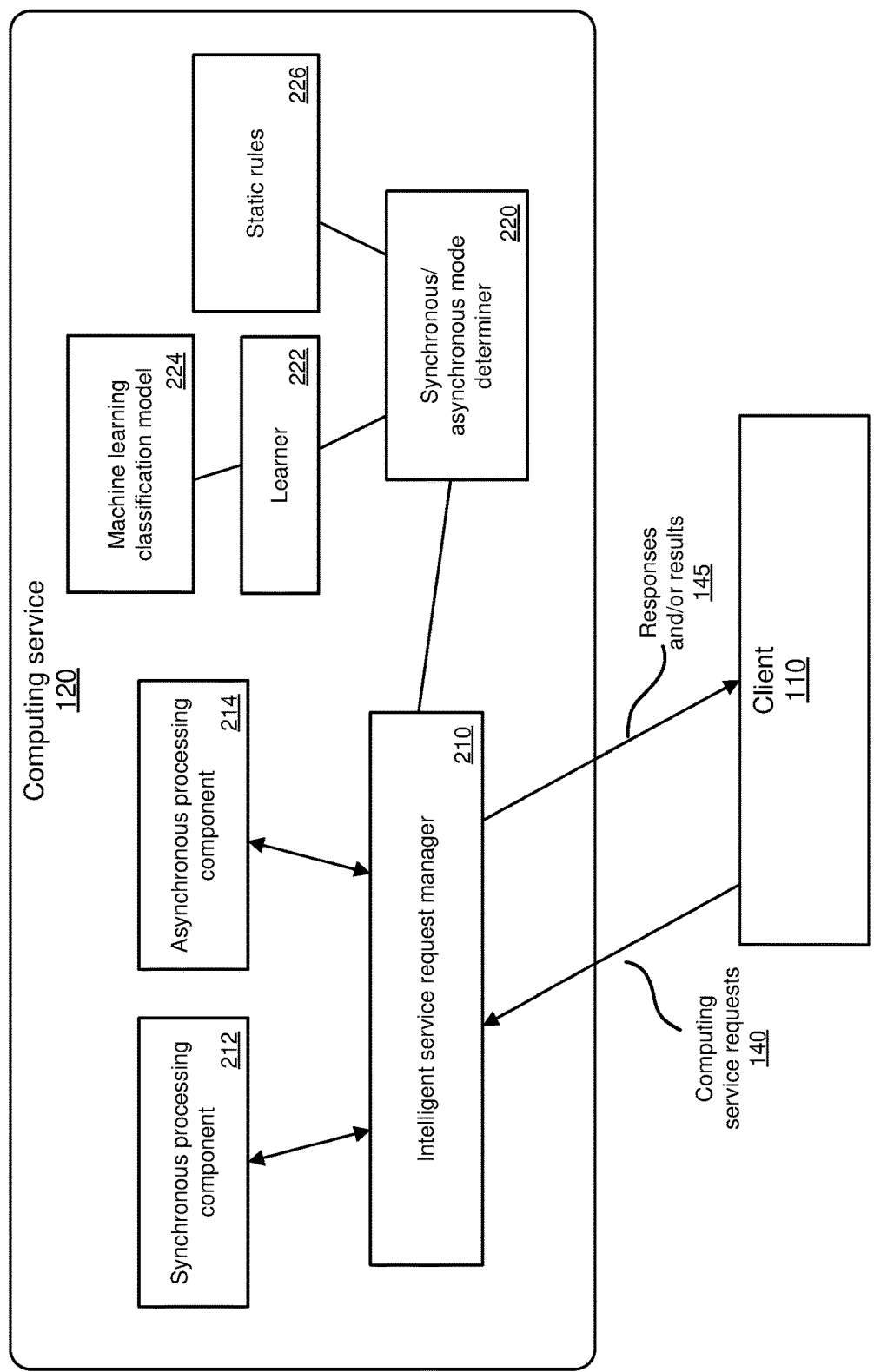
FIG. 2 is an example environment that supports dynamically determining between synchronous and asynchronous modes for processing requests, including an intelligent service request manager.

FIG. 2 depicts an example environment 200 that supports dynamically determining between synchronous and asynchronous modes for processing requests using various components. The example environment 200 depicts one way of implementing the computing service 100 depicted in FIG. 1. However, other implementations can implement the computing service 100 in different ways (e.g., using different components and/or distributing components across different services).

In the example environment 200, there are a number of components (e.g., software applications and/or software services) that perform the operations of the computing service 120. One of the components is an intelligent service request manager 210. The intelligent service request manager 210 receives computing service requests from clients (e.g., from client 110 and/or from other clients) and provides responses and/or results to clients (e.g., to client 110 and/or to other clients). The intelligent service request manager 210 processes each computing service request according to the mode provided by the synchronous/asynchronous mode determiner 220.

As an example, when a computing service request is received by the intelligent service request manager 210, the synchronous/asynchronous mode determiner 220 will determine whether to use synchronous mode or asynchronous mode to process the computing service request. The synchronous/asynchronous mode determiner 220 makes this determination based on input from the machine learning classification model 224 (a machine learning model implemented using a classification algorithm) and a set of static rules 226. In some implementations both the machine learning classification model 224 and the set of static rules 226 provide a synchronous/asynchronous mode recommendation that is considered by the synchronous/asynchronous mode determiner 220. Once the synchronous/asynchronous mode determiner 220 provides the determined mode to the intelligent service request manager 210, the intelligent service request manager 210 provides the computing service request to the determined processing component (either the synchronous processing component 212 or the asynchronous processing component 214).

In some implementations, the components comprise a learner 222. The learner 222 continuously trains the machine learning classification model 224. The learner 222 can also run the machine learning classification model 224 and provide results of the machine learning classification model 224 (e.g., synchronous/asynchronous mode recommendations) to the synchronous/asynchronous mode determiner 220.

In some implementations, the synchronous/asynchronous mode determiner 220 receives a preference from the client (e.g., from client 110) for using synchronous or asynchronous mode (e.g., as part of the computing service request). The synchronous/asynchronous mode determiner 220 can use the client-side preference when making the determination (e.g., in combination with a recommendation from the machine learning classification model 224 and/or with a recommendation from the static rules 226).

Methods for Dynamically Determining Between Synchronous and Asynchronous Modes

In the technologies described herein, methods can be provided for dynamically determining between using synchronous and asynchronous modes for processing computing service requests by computing services.

Figure 3:
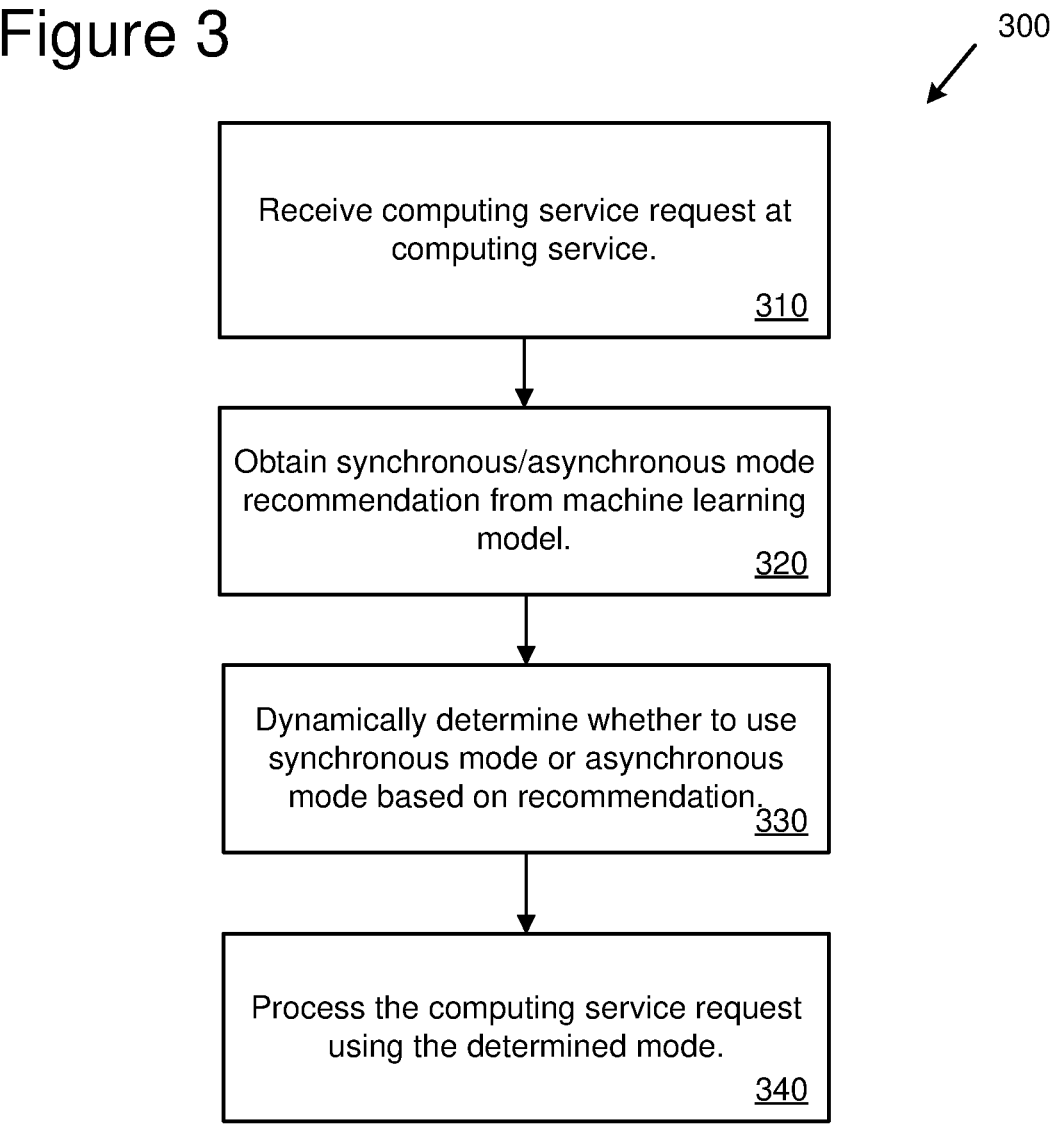
FIG. 3 is a flowchart of an example process for dynamically determining between synchronous and asynchronous modes for computing service requests using a machine learning model.

FIG. 3 is a flowchart depicting an example process 300 for dynamically determining between synchronous and asynchronous modes for computing service requests using a machine learning model. For example, the example process 300 can be performed by a computing service, such as computing service 120.

At 310, a computing service request is received at a computing service from a client. In some implementations, the computing service request comprises one or more parameters, such as a client-side synchronous/asynchronous mode hint.

At 320, a synchronous/asynchronous mode recommendation is received from a machine learning model. The machine learning model generates the synchronous/asynchronous mode recommendation based at least in part on parameters associated with the computing service request. The parameters can be received as part of the computing service request (e.g., a client-side synchronous/asynchronous mode hint) and/or from other sources (e.g., from the computing service environment). In some implementations, the parameters comprise one or more of a number of input records received with the computing service request, performance of previous computing service requests, available computing resources at the computing service, and/or client-side synchronous/asynchronous mode hints.

At 330, a dynamic determination is made to use either synchronous mode or asynchronous mode for processing the computing service request by the computing service. The dynamic determination is made based, at least in part, on the synchronous/asynchronous mode recommendation generated by the machine learning model. In some implementations, other recommendations are considered as well. For example, a second synchronous/asynchronous mode recommendation can be produced by a set of static rules and used in combination with the synchronous/asynchronous mode recommendation generated by the machine learning model. For example, the recommendation with the highest score can be selected and used. In some implementations, each recommendation is weighted (e.g., a different weighting can be applied to each recommendation), and the recommendation with the highest weighted value can be selected and used.

At 340, the computing service request is processed by the computing service using the determined mode. When synchronous mode is determined for processing the computing service request, the result of processing the computing service request is returned to the client while the client waits and before the client performs any additional operations associated with the computing service request. When asynchronous mode is determined for processing the computing service request, the computing service returns a response to the client indicating that asynchronous mode is being used to process the computing service request. The client can then perform additional operations associated with the computing service request. At a later time, the result of processing the computing service request is returned to the client (e.g., via a subsequent client poll or a call-back).

Figure 4:
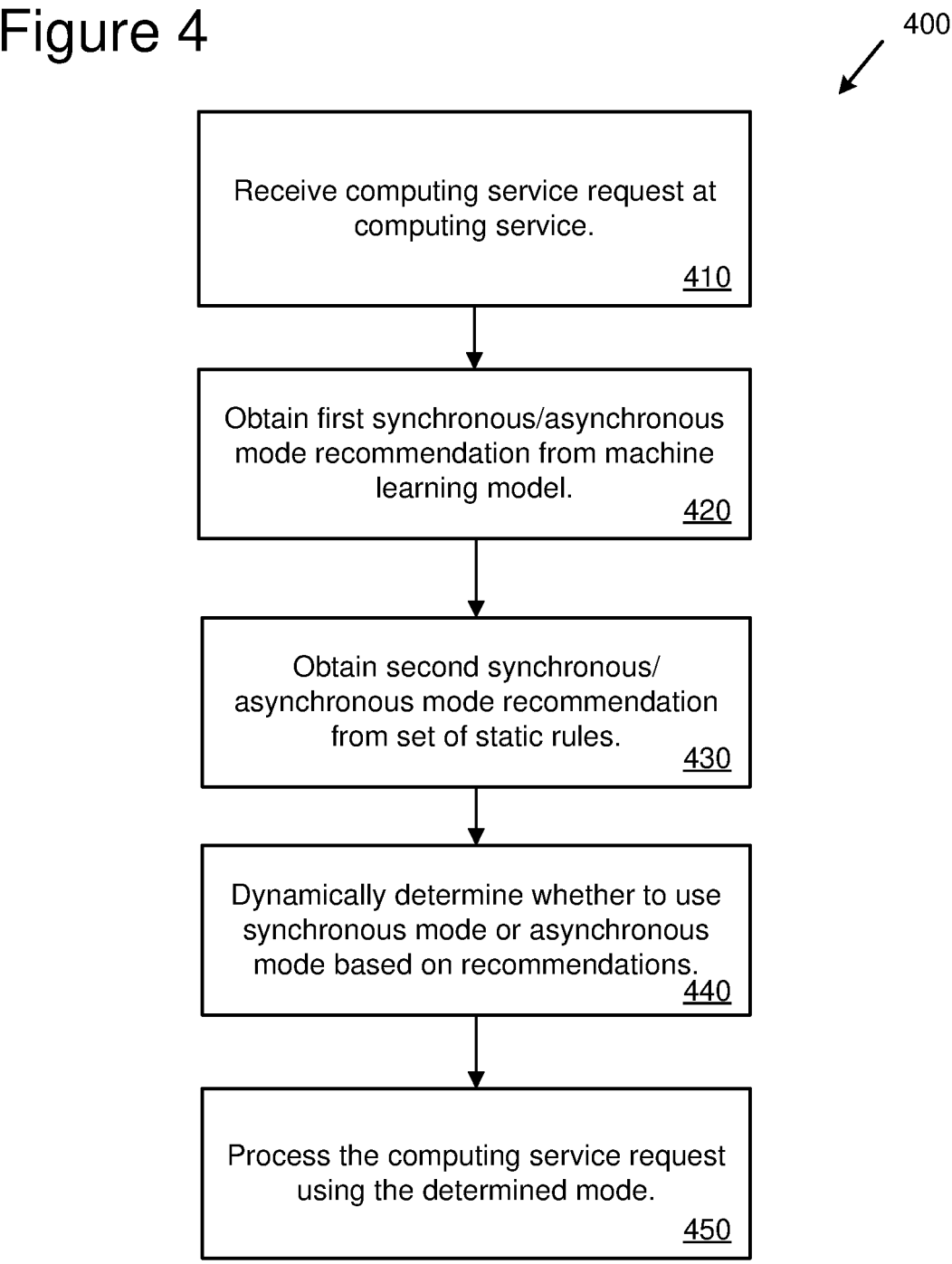
FIG. 4 is a flowchart of an example process for dynamically determining between synchronous and asynchronous modes for computing service requests using a machine learning model and a set of static rules.

FIG. 4 is a flowchart depicting an example process 400 for dynamically determining between synchronous and asynchronous modes for computing service requests using a machine learning model and a set of static rules. For example, the example process 400 can be performed by a computing service, such as computing service 120.

At 410, a computing service request is received at a computing service from a client. In some implementations, the computing service request comprises one or more parameters, such as a client-side synchronous/asynchronous mode hint.

At 420, a first synchronous/asynchronous mode recommendation is received from a machine learning model. The machine learning model generates the first synchronous/asynchronous mode recommendation based at least in part on parameters associated with the computing service request. The parameters can be received as part of the computing service request (e.g., a client-side synchronous/asynchronous mode hint) and/or from other sources (e.g., from the computing service environment). In some implementations, the parameters comprise one or more of a number of input records received with the computing service request, performance of previous computing service requests, available computing resources at the computing service, and/or client-side synchronous/asynchronous mode hints. In some implementations, the first synchronous/asynchronous mode recommendation is generated in the form of a score indicating the strength of the recommendation. For example, the first synchronous/asynchronous mode recommendation can be generated using a numerical score (e.g., a confidence value) or using another type of indication (e.g., a label such as low, medium, or high).

At 430, a second synchronous/asynchronous mode recommendation is obtained from a set of static rules. The set of static rules generate the second synchronous/asynchronous mode recommendation based at least in part on one or more parameters associated with the computing service request. The one or more parameters can include some of the same parameters that are considered by the machine learning model (e.g., that are considered when generating the first synchronous/asynchronous mode recommendation at 420) and/or different parameters. In some implementations, the second synchronous/asynchronous mode recommendation is generated in the form of a score indicating the strength of the recommendation. For example, the second synchronous/asynchronous mode recommendation can be generated using a numerical score (e.g., a confidence value) or using another type of indication (e.g., a label such as low, medium, or high).

At 440, a dynamic determination is made to use either synchronous mode or asynchronous mode for processing the computing service request by the computing service. The dynamic determination is made based, at least in part, on the first synchronous/asynchronous mode recommendation generated by the machine learning model and the second synchronous/asynchronous mode recommendation generated by the set of static rules. For example, the score of each recommendation can be evaluated and the recommendation with the highest score can be selected. In some implementations, the scores are weighted (e.g., a different weighting can be applied to each recommendation), and the recommendation with the highest weighted score can be selected and used.

At 450, the computing service request is processed by the computing service using the determined mode. When synchronous mode is determined for processing the computing service request, the result of processing the computing service request is returned to the client while the client waits and before the client performs any additional operations associated with the computing service request. When asynchronous mode is determined for processing the computing service request, the computing service returns a response to the client indicating that asynchronous mode is being used to process the computing service request. The client can then perform additional operations associated with the computing service request. At a later time, the result of processing the computing service request is returned to the client (e.g., via a subsequent client poll or a call-back).

Figure 5:
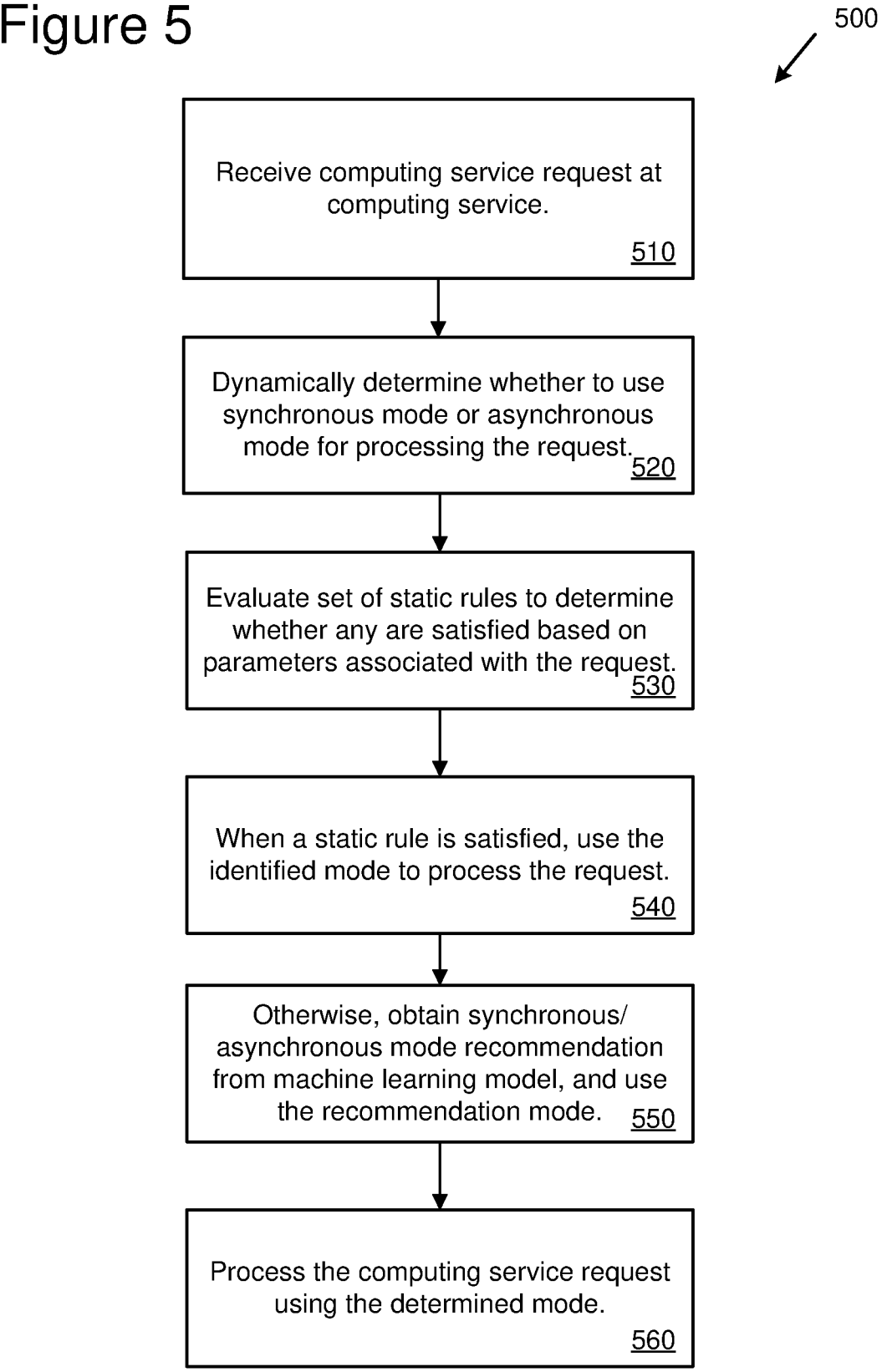
FIG. 5 is a flowchart of an example process for dynamically determining between synchronous and asynchronous modes for computing service requests by evaluating a set of static rules and/or using a machine learning model.

FIG. 5 is a flowchart depicting an example process 500 for dynamically determining between synchronous and asynchronous modes for computing service requests by evaluating a set of static rules and/or using a machine learning model. For example, the example process 500 can be performed by a computing service, such as computing service 120.

At 510, a computing service request is received at a computing service from a client. In some implementations, the computing service request comprises one or more parameters, such as a client-side synchronous/asynchronous mode hint.

At 520, a number of operations are performed to dynamically determine whether to use synchronous mode or asynchronous mode for processing the computing service request. In some implementations, the operations depicted at 530-550 are performed.

At 530, a set of static rules are evaluated to determine whether any are satisfied based on one or more parameters associated with the computing service request. At 540, when a static rule (of the set of static rules) is satisfied, the mode identified by the satisfied static rule is identified for processing the computing service request. For example, one of the rules can evaluate a parameter indicating the number of records associated with the computing service request by comparing the number of records to a threshold value. If the number of records is greater than the threshold value, then the rule is satisfied. For example, the rule can indicate that asynchronous mode is used when the rule is satisfied.

At 550, when the evaluation indicates that none of the set of static rules are satisfied, a synchronous/asynchronous mode recommendation is obtained from a machine learning model. The machine learning model generates the synchronous/asynchronous mode recommendation based at least in part on a plurality of parameters associated with the computing service request. The parameters can be received as part of the computing service request (e.g., a client-side synchronous/asynchronous mode hint) and/or from other sources (e.g., from the computing service environment). In some implementations, the parameters comprise one or more of a number of input records received with the computing service request, performance of previous computing service requests, available computing resources at the computing service, and/or client-side synchronous/asynchronous mode hints. The mode indicated by the synchronous/asynchronous mode recommendation is identified for use when processing the computing service request.

At 560, the computing service request is processed by the computing service using the determined mode. When synchronous mode is determined for processing the computing service request, the result of processing the computing service request is returned to the client while the client waits and before the client performs any additional operations associated with the computing service request. When asynchronous mode is determined for processing the computing service request, the computing service returns a response to the client indicating that asynchronous mode is being used to process the computing service request. The client can then perform additional operations associated with the computing service request. At a later time, the result of processing the computing service request is returned to the client (e.g., via a subsequent client poll or a call-back).

Computing Systems

Figure 6:
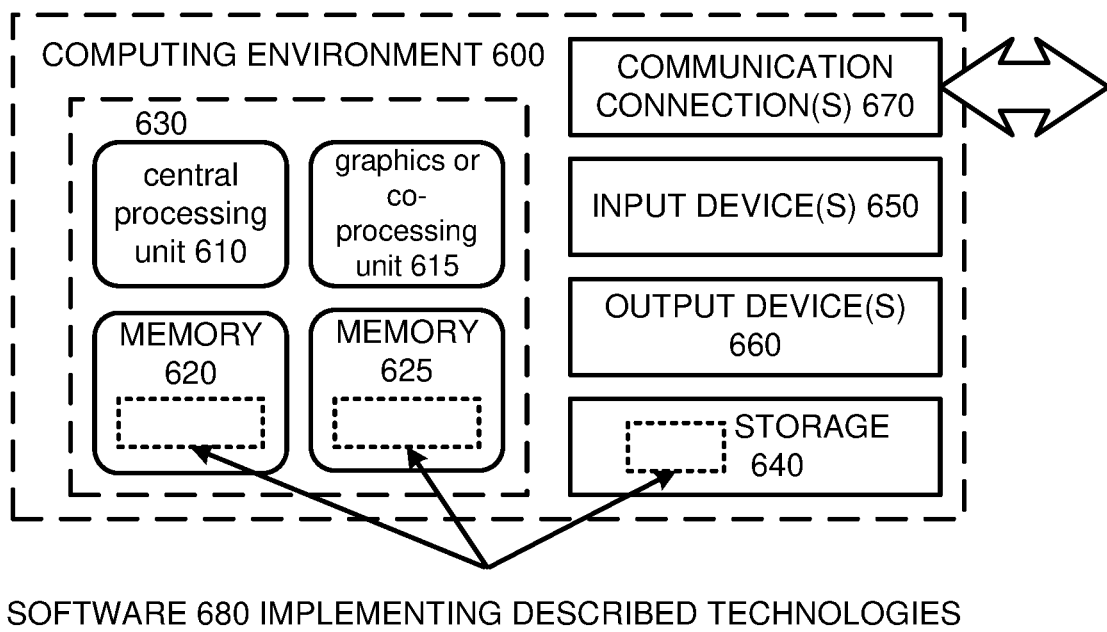
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
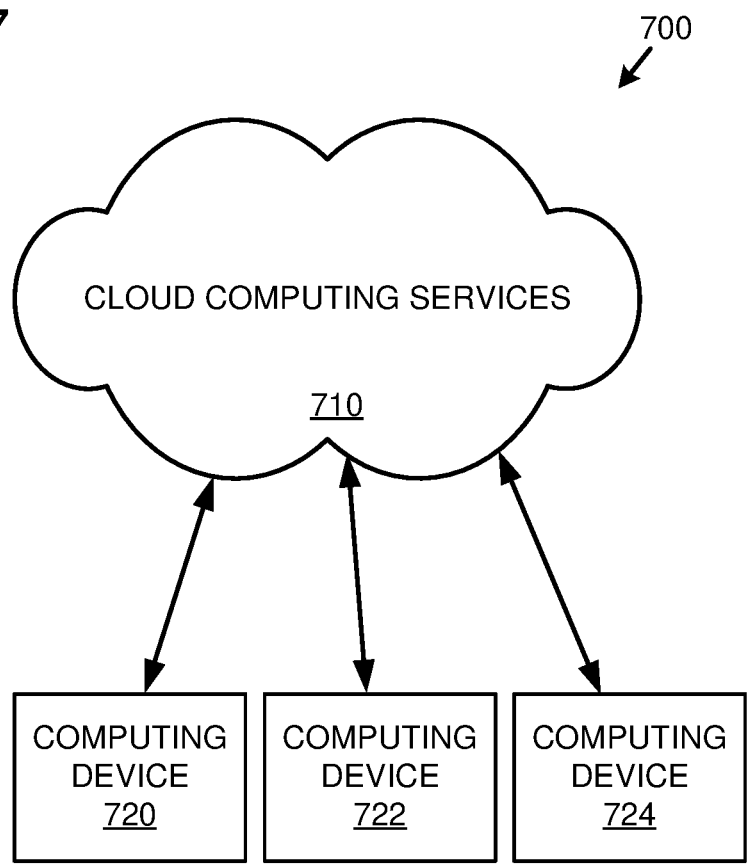
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for dynamically determining between synchronous and asynchronous modes for computing service requests, the method comprising:
   receiving, at a computing service running on the one or more computing devices from a client, a computing service request;
   obtaining a first synchronous/asynchronous mode recommendation from a machine learning model, wherein the machine learning model generates the first synchronous/asynchronous mode recommendation based at least in part on a plurality of parameters associated with the computing service request, and wherein synchronous/asynchronous mode recommendations identify one of synchronous mode or asynchronous mode to use for processing computing service requests;
   obtaining a second synchronous/asynchronous mode recommendation from a set of static rules, wherein the set of static rules generate the second synchronous/asynchronous mode recommendation based at least in part on one or more parameters associated with the computing service request;
   dynamically determining, by the computing service, whether to use synchronous mode or asynchronous mode for processing the computing service request by the computing service based at least in part on the first synchronous/asynchronous mode recommendation and the second synchronous/asynchronous mode recommendation; and
   processing, by the computing service, the computing service request using the determined mode.

2. The method of claim 1, wherein dynamically determining whether to use synchronous mode or asynchronous mode for processing the computing service request is performed entirely by the computing service.

3. The method of claim 1, wherein the plurality of parameters comprise:
   a number of input records received with the computing service request;
   performance of previous computing service requests; and
   available computing resources at the computing service.

4. The method of claim 1, further comprising:
   applying a first weight value to the first synchronous/asynchronous mode recommendation and applying a second weight value to the second synchronous/asynchronous mode recommendation;
   wherein the first weighted synchronous/asynchronous mode recommendation and the second weighted synchronous/asynchronous mode recommendation are used when dynamically determining whether to use synchronous mode or asynchronous mode.

5. The method of claim 4, wherein the second weight value is greater than the first weight value.

6. The method of claim 1, wherein dynamically determining whether to use synchronous mode or asynchronous mode comprises:
   upon determining that a specific rule, of the set of rules, matches the computing service request, selecting the second synchronous/asynchronous mode recommendation to use for processing the computing service request as an override.

7. The method of claim 1, wherein the set of static rules comprise a static rule that evaluates a parameter indicating a number of input records received with the computing service request, and wherein the static rule is used to generate the second synchronous/asynchronous mode recommendation by:
   comparing the number of input records to a threshold;
   when the number of input records is greater than the threshold, selecting asynchronous mode for second the synchronous/asynchronous mode recommendation; and
   otherwise, selecting synchronous mode for the second synchronous/asynchronous mode recommendation.

8. The method of claim 1, further comprising:
   receiving, at the computing service from the client, a client-side synchronous/asynchronous mode hint;
   wherein dynamically determining whether to use synchronous mode or asynchronous mode for processing the computing service request is further based on the client-side synchronous/asynchronous mode hint.

9. The method of claim 1, further comprising:
   when synchronous mode is determined for processing the computing service request, returning a result of processing the computing service request to the client while the client waits and before the client performs any additional operations associated with the computing service request; and
   when asynchronous mode is determined for processing the computing service request:
       returning a response to the client indicating that asynchronous mode is being used to process the computing service request and allowing the client to perform additional operations associated with the computing service request; and
       returning a result of processing the computing service request to the client via a subsequent client poll or a call-back.

10. One or more computing devices comprising:
    processors; and
    memory;
    the one or more computing devices configured, via computer-executable instructions, for dynamically determining between synchronous and asynchronous modes for computing service requests, the operations comprising:
        receiving, at a computing service running on the one or more computing devices from a client, a computing service request;
        obtaining a first synchronous/asynchronous mode recommendation from a machine learning model, wherein the machine learning model generates the first synchronous/asynchronous mode recommendation based at least in part on a plurality of parameters associated with the computing service request, and wherein synchronous/asynchronous mode recommendations identify one of synchronous mode or asynchronous mode to use for processing computing service requests;

obtaining a second synchronous/asynchronous mode recommendation from a set of static rules, wherein the set of static rules generate the second synchronous/asynchronous mode recommendation based at least in part on one or more parameters associated with the computing service request;

dynamically determining whether to use synchronous mode or asynchronous mode for processing the computing service request by the computing service based at least in part on the first synchronous/asynchronous mode recommendation and the second synchronous/asynchronous mode recommendation; and processing, by the computing service, the computing service request using the determined mode.

11. The one or more computing devices of claim 10, wherein the dynamically determining whether to use synchronous mode or asynchronous mode for processing the computing service request is performed entirely by the computing service.

12. The one or more computing devices of claim 10, the operations further comprising:

applying a first weight value to the first synchronous/asynchronous mode recommendation and applying a second weight value to the second synchronous/asynchronous mode recommendation;

wherein the first weighted synchronous/asynchronous mode recommendation and the second weighted synchronous/asynchronous mode recommendation are used when dynamically determining whether to use synchronous mode or asynchronous mode.

13. The one or more computing devices of claim 10, wherein dynamically determining whether to use synchronous mode or asynchronous mode comprises:

upon determining that a specific rule, of the set of rules, matches the computing service request, selecting the second synchronous/asynchronous mode recommendation to use for processing the computing service request as an override.

14. The one or more computing devices of claim 10, wherein the plurality of parameters comprise:

a number of input records received with the computing service request;

performance of previous computing service requests, comprising time taken to process previous computing service requests that are of a same type as the computing service request; and available computing resources at the computing service, comprising current status of one or more supporting services that are being used to process the computing service request.

15. The one or more computing devices of claim 10, wherein the set of static rules comprise a static rule that evaluates a parameter indicating a number of input records received with the computing service request, and wherein the static rule is used to generate the second synchronous/asynchronous mode recommendation by:

comparing the number of input records to a threshold;

when the number of input records is greater than the threshold, selecting asynchronous mode for second the synchronous/asynchronous mode recommendation; and otherwise, selecting synchronous mode for the second synchronous/asynchronous mode recommendation.

16. The one or more computing devices of claim 10, the operations further comprising:

receiving, at the computing service from the client, a client-side synchronous/asynchronous mode hint;

wherein dynamically determining whether to use synchronous mode or asynchronous mode for processing the computing service request is further based on the client-side synchronous/asynchronous mode hint.

17. The one or more computing devices of claim 10, the operations further comprising:

when synchronous mode is determined for processing the computing service request, returning a result of processing the computing service request to the client while the client waits and before the client performs any additional operations associated with the computing service request; and when asynchronous mode is determined for processing the computing service request:

returning a response to the client indicating that asynchronous mode is being used to process the computing service request and allowing the client to perform additional operations associated with the computing service request; and returning a result of processing the computing service request to the client via a subsequent client poll or a call-back.

18. One or more computer-readable storage media storing computer-executable instructions for execution on one or more computing devices to perform operations for dynamically determining between synchronous and asynchronous modes for computing service requests, the operations comprising:

receiving, at a computing service running on the one or more computing devices from a client, a computing service request;

dynamically determining whether to use synchronous mode or asynchronous mode for processing the computing service request by the computing service, comprising:

evaluating a set of static rules to determine whether any of the static rules are satisfied based at least in part on one or more parameters associated with the computing service request;

when a static rule is satisfied based on the evaluation, identifying one of synchronous mode or asynchronous mode to use for processing the computing service request according to the satisfied static rule;

when the evaluation indicates that none of the set of static rules are satisfied, obtaining a synchronous/asynchronous mode recommendation from a machine learning model, wherein the machine learning model generates the synchronous/asynchronous mode recommendation based at least in part on a plurality of parameters associated with the computing service request, and wherein the synchronous/asynchronous mode recommendation identifies one of synchronous mode or asynchronous mode to use for processing the computing service request; and processing, by the computing service, the computing service request using the determined mode.

19. The one or more computer-readable storage media of claim 18, wherein the plurality of parameters comprise:
a number of input records received with the computing service request;
performance of previous computing service requests, comprising time taken to process previous computing service requests that are of a same type as the computing service request; and
available computing resources at the computing service, comprising current status of one or more supporting services that are being used to process the computing service request.

* * * * *